United States Patent Office 3,471,455
Patented Oct. 7, 1969

3,471,455
POLY (BETA-LACTONE) COMPOSITIONS AND PROCESS FOR PREPARING SAME
Frederik L. Binsbergen, Amsterdam, Netherlands, assignor to Shell Oil Company, New York, N.Y., a corporation of Delaware
No Drawing. Filed May 8, 1967, Ser. No. 636,616
Claims priority, application Netherlands, May 16, 1966, 6606665
Int. Cl. C08g 39/00; C08k 1/02
U.S. Cl. 260—78.3                     8 Claims

ABSTRACT OF THE DISCLOSURE

The crystalline structure and therefore the physical properties, of poly (beta-lactones) is improved by incorporating therein one or more of the compounds: (a) MeX, wherein X is halogen or nitrogen and Me is an alkali metal or boron or (b) salts of mono-, bi- and trivalent metals and organic acids containing an acidic hydroxyl group attached to an atomic carbon atom by means of an

group wherein Y is a carbon, sulfur or phosphorus atom.

BACKGROUND OF THE INVENTION

This invention relates to poly (beta-lactones) having improved crystalline structure and improved physical properties.

Processes are known for the polymerization of lactones, particularly the beta-lactones, to crystalline linear polyesters having a high molecular weight. See, for example, U.S. 3,021,309, U.S. 3,268,486, British 766,347, French 1,231,163 and Belgian 649,828. These polyesters are valuable thermoplastic polymers from which, with the aid of known shaping techniques, useful shaped objects can be made, such as foils, sheets, plates, profiles, tubes, fibers, threads and solid or hollow pieces. In practice, such products from crystalline thermoplastic polymers are usually manufactured under conditions where crystallization of the polymers takes place. However, this crystallization of the said polyesters may readily lead to the formation of non-homogeneous crystalline structures in which spherulites with undesirably large dimensions occur. Too large spherulites, in general, significantly reduce the physical and mechanical properties of the polyesters.

It is therefore important to reduce the spherulite size during the crystallization. It has now been unexpectedly discovered that this desired spherulite size reduction can be obtained by crystallizing the polyesters in the presence of certain nucleating compounds described in greater detail hereinafter.

SUMMARY OF THE INVENTION

The invention relates to compositions comprising one or more linear crystalline polyesters obtained by the polymerization of lactones, particularly the beta-lactones, in the presence of one or more nucleating compounds. The invention also provides a process for the preparation of crystalline poly (beta-lactones) having improved crystallinity, improved physical and mechanical properties.

When lactones are polymerized in the presence of these nucleating compounds, the resulting polylactone spherulite size of the crystalline structure is significantly reduced, resulting in improved physical and mechanical properties. In other words, the instant process comprises preparing a melt consisting of the poly (lactone) and the nucleating compound and then subsequently crystallizing the polyesters by cooling down said melt. Thus, the use of these nucleating compounds results in the improvement of the physical and mechanical properties of the crystalline polylactones when said polylactones are crystallized from a molten state or phase. The mechanical properties which are improved include the following: increased tensile and flexural strength; increased elongation at break; improved hardness, shear-stress coefficient, impact resistance, modulus of elasticity and yield stress. The improved physical properties include improved surface structure and surface gloss of shaped objects. Furthermore, upon cooling down the melt, the compositions solidify more rapidly than polylactones which do not contain such nucleating compounds, therefore, the instant compositions are more suitable for use with compression-molding or injection-molding techniques. The instant novel compositions also exhibit improved shrinkage properties as shown by the lack of voids when molded, whereas crystalline polyesters per se customarily show a pronounced tendency to the formation of voids.

DESCRIPTION OF THE PREFERRED EMBODIMENT

The compositions of the present invention are compositions comprising one or more crystalline linear polyesters obtained by polymerization of lactones, and particularly the beta-lactones and one or more compounds of the following categories:

(a) salts with the general formula MeX, wherein X represents a halogen with an atomic number of at least 17 or nitrogen, and Me represents an alkali metal or boron, and (b) salts of mono-, bi- and trivalent metals and organic acids which contain an acidic hydroxyl group, which is attached to an atomic carbon atom by means of a group with the structure

wherein Y represents a carbon, sulphur or phosphorus atom.

The term "crystalline linear polyesters" is used in this specification to denote those linear polyesters which, as shown by X-ray analysis, have a degree of crystallinity of at least 30%. However, special preference is given to polyesters with a degree of crystallinity of at least 60%.

Particularly preferred polyesters are the polymers obtained by polymerizing beta-lactones, particularly the alpha,alpha-dialkyl-beta-propiolactones wherein the alkyl groups contain from 1 to 4 carbon atoms, including those compounds in which the two alkyl groups and the alpha-carbon atom of the lactone ring are combined to form one cyclic structure, such as, for example, 2-oxa-4-spiro [3.6]decanone-1. Suitable examples include alpha,alpha-dimethyl - beta - propiolactone, alpha-methyl-alpha-ethyl-beta - propiolactone, alpha - methyl-alpha-isopropyl-beta-propiolactone, alpha-ethyl-alpha-tert-butyl-propiolactone, alpha,alpha-diisopropyl-propiolactone, etc. The most preferred alpha,alpha-dialkyl-beta-propiolactone is alpha, alpha-dimethyl-beta-propiolactone.

The poly (beta-lactones) may be prepared by any conventional means, usually in the presence of a suitable catalyst, (see U.S. 3,021,309, U.S. 3,268,486, British 766,347, French 1,231,163 or Belgian 649,828).

Suitable catalysts which may be used in polymerizing the beta-lactones include the primary, secondary or tertiary amines such as trimethylamine, triethylamine, tri(beta-hydroxyethyl)amine, tripropylamine, triisopropylamine, methyldiethylamine, tri - n - butylamine, diethyl-n-butylamine, dimethylhexylamine, triphenylamine, diethylamine, di-n-propylamine, diisopropylamine, dibutylamine, monobutylamine, monophenylamine, triethylenediamine, hexamethylenetetraamine, and the like. Other catalysts include quaternary ammonium compounds and especially the tetraalkylammonium halides or hydroxides where the alkyl groups contain from 1 to about 4 carbon atoms such as tetraethylammonium bromide, tetrapropylammonium bromide, ethyltriisopropylammonium chloride, tetraethylammonium hydroxide, etc. These catalysts are disclosed in copending U.S. application Ser. No. 388,662, filed Aug. 10, 1964.

Another group of very suitable polymerization catalysts are the arsines, stibines and phosphines as well as the addition products thereof. Suitable catalysts of this type are those disclosed in copending U.S. application Ser. No. 363,992, filed Apr. 30, 1964, the description thereof which is incorporated herein by reference. Especially preferred catalysts of this type are the tertiary phosphines and the quaternary phosphonium compounds such as trimethylphosphine, triethylphosphine, tri(beta-chloroethyl)phosphine, tripropylphosphine, triisopropylphosphine, tri-n-butylphosphine, triisobutylphosphine, dimethylhexylphosphine, diethyl-n-pentylphosphine, and diisopropyl-n-butylphosphine, triphenylphosphine, tribenzylphosphine and tritolylphosphine tetrabutylphosphonium bromide, triphenylbutylphosphonium bromide, tetraethylphosphonium hydroxide and ethyltriisopropylphosphonium bromide.

The terms polymerizing, polymerization, polymer and monomer, whenever used in this specification, should be interpreted as covering also copolymerizing, copolymerization, copolymer and comonomer. By copolymerization is meant that the beta-lactones are polymerized together among themselves or with other compounds that can be polymerized. Examples of compounds that can be copolymerized with beta-lactones are, for example, epoxy compounds such as ethylene oxide, propylene oxide, epichlorohydrin, and glycidyl ethers and esters, and the like.

Suitable catalysts for preparing lactone polymers having a very high molecular weight include the organic compounds of an element of Group Va of the Periodic system.

In general, the catalyst may be employed in widely varying concentrations, for example, in concentrations of 0.0001 to 10% by weight, calculated on the monomer. Ordinarily, however, concentrations of 0.001 to 1% by weight are utilized.

The compounds belonging to category (a) mentioned hereinbefore are boron nitride and the chlorides, bromides and iodides of alkali metals, among which the sodium and potassium chlorides are particularly preferred. The compound in this category (a) having the strongest nucleating action is boron nitride.

As stated hereinbefore, the compounds of category (b) comprise salts of organic acids containing a group

which on one side is attached to an acidic hydroxyl group and on the other to an aromatic carbon atom. For the sake of simplicity, the Y atom in the above formula has been drawn as being tetravalent only, a possible fifth or sixth valence bond having been omitted. This should, however, by no means be considered restrictive. In the case of the symbol Y representing a sulphur atom, this atom may be both tetravalent and hexavalent. In the case of Y being a phosphorus atom, pentavalent phosphorus is meant. As a result, the said group of organic acids comprises: carboxylic acids, sulphonic acids, sulphinic acids, phosphonic acids, acids and phosphinic acids, wherein the acidic hydroxyl group therefore forms part of the respective structures

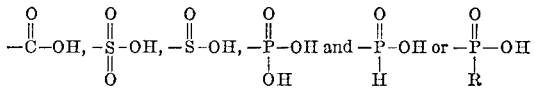

wherein the group R may be a hydrocarbon radical, and preferably an alkyl or aryl group.

Particularly preferred among the compounds of category (b) are the salts of carboxylic acids, sulphonic acids and phosphinic acids containing the group indicated above within a hydrogen atom directly attached to phosphorus.

The aromatic carbon atom which carries the group

is a carbon atom which forms part of a single ring or a system of condensed rings of an aromatic nature, which in this specification must be taken to include plane rings or ring systems containing a system of delocalized π-electrons. As a rule, the rings or ring systems will be aryl groups, but heterocyclic structures of an aromatic nature, such as a pyridine ring, are also possible.

The aromatic rings or ring systems may in addition to or instead of hydrogen atoms carry as substituents one or more other atoms, such as halogen atoms, or other groups, as, for example, aryl, alkyl, alkoxy, cycloalkyl, hydroxy, amino, nitro, acyl, carboxyl and esterified carboxyl groups.

Of the carboxylic salts, the salts of acids containing a carboxyl group attached to a benzene ring have an attractive nucleating action. More specifically, the salts of benzenecarboxylic acids which carry as a substituent a tertiary alkyl group or a carboxyl group which may or may not be esterified have proved excellent nucleating agents. Examples of such active salts are salts of p-tert-butylbenzoic acid, phthalic acid, tetrachlorophthalic acid and salts of the monoalkyl esters of phthalic acid and tetrachlorophthalic acid.

Examples of salts of other benzenecarboxylic acids which, although preferred to a lesser extent, may nevertheless be employed are salts of benzoic acid, p-nitrobenzoic acid, 2,4,6-trimethylbenzoic acid, 2,4-diethyl-6-isopropylbenzoic acid, 2-octyl-4-hydroxybenzoic acid, 2-hydroxy-4-butylbenzoic acid, p-cyclohexylbenzoic acid, 2-aminobenzene - 1,4 - dicarboxylic acid, tetrachlorobenzene-1,4-dicarboxylic acid, dichlorodiaminobenzene-1,4-dicarboxylic acid, pyromellitic acid and trimellitic acid.

Other suitable nucleating agents are not only salts of benzenecarboxylic acids, but also salts of other aromatic carboxylic acids, such as naphthalene-, anthracene- or phenanthrenecarboxylic acids. Examples thereof are naphthalene-1-carboxylic acid, naphthalene-2-carboxylic acid, 4-nitronaphthalene-1-carboxylic acid, 5,6,7,8-tetrachloronaphthalene-1,4-dicarboxylic acid, 4 - tert-butylnaphthalene-1,6-dicarboxylic acid, anthracene-1-carboxylic acid, anthracene-9,10-dicarboxylic acid and 2-amino-4-isopropylphenanthrene-1-carboxylic acid.

Among the sulphonic salts, the salts derived from naphthalenesulphonic acids are very effective nucleating agents. Examples of such very suitable salts are the salts of naphthalene - 1 - sulphonic acid, naphthalene-2-sulphonic acid, 2-hydroxynaphthalene-6,8-disulphonic acid, 2-aminonaphthalene-4,8-disulphonic acid, naphthalene-1,3,5-trisulphonic acid, 6-cyclohexylnaphthalene-1-sulphonic acid, 4-tert-butylnaphthalene-2-sulphonic acid, 8-phenylnaphthalene-2-sulphonic acid, 4-nitronaphthalene-2-sulphonic acid, 4-isopropyl-6-hydroxy - 8 - chloronaphthalene-1,3-disulphonic acid and 6-amino-8-octyl-naphthalene-1,3,5-trisulphonic acid.

Salts which are preferred to a lesser extent but which may also be used are those of benzenesulphonic acid, such as 2-methylbenzenesulphonic acid, 4-tert-butylbenzenesulphonic acid, 4-amino - 6 - octylbenzene-1,3-disulphonic acid and 3-nitrobenzenesulphonic acid and furthermore also anthracene- and phenanthrene-, mono-, di- or polysulphonic acids.

When in the aforementioned acids the sulphonic acid groups are replaced by a sulphine group, the salts derived therefrom have, as a rule, a weaker nucleating action. In some cases, however, the use of sulphinic salts may have advantages over that of the corresponding sulphonic salts.

Suitable phosphinic salts are substantially those salts of benzenephosphinic acids, such as the benzenephosphinic acid itself and the compounds derived therefrom, in which the benzene ring carries an alkyl group as a substituent in the 2-, 4- or 5-position, such as 2-methylbenzenephosphinic acid, 2,4-diethylbenzenephosphinic acid, 2,4-dimethyl-5-octylbenzenephosphinic acid and 2-methyl-4-hexyl-5-cyclohexylbenzenephosphinic acids.

The mono-, bi- or trivalent metals in the aforementioned salts of organic acids are primarily the alkali metals and alkaline earth metals, among which special preference is given to potassium, sodium and barium. However, the invention is non-restrictive in this respect and other alkali metals or alkaline earth metals such as lithium, cesium, calcium and magnesium and furthermore also mono- to trivalent metals which do not belong to the alkali metals or alkaline earth metals, such as copper, iron, chromium, zinc, tin, nickel, cobalt and manganese, may also be used as metallic components of the nucleating organic salts of said category (b).

It is further noted that the above discussion of the metal salts of organic acids exclusively refers to the neutral salts and among these neutral salts the sodium salts are the most suitable for application in actual practice.

As a rule, the nucleating compounds of the categories (a) and (b) defined hereinbefore are applied in a finely divided form. As a general rule, the nucleating action is greater when the particle size is smaller. Accordingly, the use of nucleating agents with an average particle size below $1\mu$ is particularly recommended.

The quantities in which the nucleating agents are present in the compositions according to the invention usually range from 0.0001 to 5 percent by weight, calculated on weight of composition. Quantities of from 0.01 to 2 percent by weight are preferred.

The invention furthermore relates to a process for the preparation of the compositions discussed hereinbefore, which process comprises the incorporation of one or more of the compounds of said categories (a) and (b) into the linear polyesters concerned. For this purpose any mixing technique known per se is in principle suitable, for example, dry mixing, Banbury-mixing or mixing the polyesters with aqueous solutions or suspensions of the nucleating agents, followed by precipitation of the salts with a salting-out agent, such as acetone. These methods are not restricted to addition of ready salts to ready polyesters or to mixing of these compounds. It is also possible to cause the salts to be formed in situ in the presence of polyesters by reaction of acidic and basic components. Conversely, it is also possible to mix the salts with monomeric lactones and to perform the polymerization of the lactones, only then, in which case the polyesters are therefore formed in situ.

Shaping of the compositions according to the invention may take place before and/or during cooling down of the compositions, when crystallization of the polyesters occurs. If desired, this cooling procedure may take place very rapidly, that is, as rapidly as permitted by heat conduction. However, slow cooling is also possible. The duration of this slow cooling procedure may be from a few minutes to several hours. Shaping may proceed in any manner known for this purpose and in any apparatus suited to this end. Articles of use may be manufactured by compression-molding or injection-molding and films may be obtained by blowing or by slit-extrusion, while the latter technique may also be employed to obtain fibers, threads, bars, strips, and the like, which, if desired, may be divided into granules, rods, flakes, chips, and the like. Since there are several other suitable shaping techniques, this enumeration should not be considered restrictive, but illustrative only. Fibers and threads may be stretched to improve further their properties.

During shaping, the instant compositions may contain in addition to the nucleating compounds, one or more other conventional additives, such as antioxidants, heat and light stabilizers, antistatic additives, dyes, pigments, carbon black or other fillers.

The following examples are presented in order to illustrate the process and compositions of the invention. Unless otherwise specified, parts are given by weight.

Example I

In a number of experiments, the nucleating action was determined of the compounds listed in Table I. In each experiment, 2 mg. of each nucleating compound was mixed with 200 mg. of polyester in a high speed vibrating ball mill.

The polyester, which had been prepared by polymerization of $\alpha,\alpha$-dimethyl-$\beta$-propriolactone according to the method described in the Belgian Patent No. 649,828, had an intrinsic viscosity, measured in trifluoroacetic acid at 25° C., of 3.8 dl./g. and a degree of crystallinity of 75% determined by X-ray diffraction of a sample of a polyester obtained by crystallization from the melt applying a cooling rate of 20° C./min. The polyester contained 0.05 percent by weight of tetramethyl thiuram disulphide and 0.2 percent by weight of tri-(nonylphenyl)phosphite as heat-stabilizing additives.

5 mg. of each composition was pressed into a platelet of 0.05 mm. thickness between a cover glass and a slide at a temperature of 260° C. Subsequently, the polyester was caused to crystallize by cooling the microscopic preparation thus obtained to the air at a cooling rate of 100° C./min. Next, the average diameter of the spherulites was determined by visual microscopic observation.

In the experiment on the composition which did not contain nucleating compounds the microscopic preparation proved to consist merely of spherulites with strongly varying dimensions, the smallest spherulites having a diameter of about $150\mu$ and the largest, a diameter of about $500\mu$.

In Table I, the nucleating action of the compounds tested is tabulated by means of a relative scale. To the spherulites with an average diameter of between 50 and $150\mu$ a rating of 1 was assigned. A rating of 2 was assigned to spherulites with a size between 20 and $50\mu$, a rating of 3 refers to spherulites with a diameter of between 5 and $20\mu$ and a rating of 4 was assigned to spherulites with a diameter below $5\mu$.

TABLE I

| Additive: | Action |
|---|---|
| Boron nitride | 4 |
| Lithium chloride | 3 |
| Sodium chloride | 3 |
| Potassium chloride | 2 |
| Lithium bromide | 3 |
| Sodium bromide | 2 |
| Potassium bromide | 3 |
| Lithium iodide | 3 |
| Sodium iodide | 3 |
| Potassium iodide | 3 |

Example II

The procedure described in Example I was substantially repeated wherein the nucleating action was investigated of the metal salts of carboxylic acids listed in Table II. In these experiments, too, the quantities of the additives employed amounted to 2 mg. per 200 mg. polyester.

Salts derived from:

TABLE II

| Metal | Carboxylic acids | Action |
|---|---|---|
| K | Benzoic acid | 2 |
| Ba | do | 3 |
| Cu [1] | do | 3 |
| Zn | 2,4,6-trimethylbenzoic acid | 2 |
| Zn | p-Nitrobenzoic acid | 1 |
| Na | 2,5-dihydroxybenzoic acid | 3 |
| Zn | 2-hydroxy-3-methylbenzoic acid | 2 |
| Zn | 2-hydroxy-4-methylbenzoic acid | 2 |
| Zn | 2-hydroxy-4-tert-butylbenozic acid | 1 |
| Na | 4-tert-butylbenzoic acid | 2 |
| Mg | do | 3 |
| Ba | do | 1 |
| Al [3] | do | 2 |
| Cu [1] | do | 3 |
| Cr [2] | do | 3 |
| Sn [3] | do | 2 |
| Cu [1] | Phthalic acid | 3 |
| Na | Tetrachlorophthalic acid | 3 |
| Ba | do | 1 |
| Cu | do | 2 |
| Na | Monomethyl ester of phthalic acid | 3 |
| Na | Monoethyl ester of phthalic acid | 3 |
| Na | Monoethyl ester of tetrachlorophthalic acid | 2 |
| Na | Mono-2-methoxyethyl ester of tetrachlorophthalic acid | 3 |
| Na | Pyromellitic acid | 3 |
| Ba | do | 1 |
| Cu [1] | Pyridine-3-carboxylic acid | 3 |
| Na | Pyridine-4-carboxylic acid | 1 |
| Cu [1] | do | 2 |
| Cu [1] | Pyridine-2,3-dicarboxylic acid | 1 |

[1] Monovalent metal.
[2] Trivalent metal.
[3] Bivalent metal.

Example III

The procedure of Examples I and II was essentially repeated using the same concentrations. The nucleating action was determined of a number of aromatic sulphonic, phosphonic and phosphinic acids. The results are tabulated in Table III.

Salts derived from:

TABLE III

| Metal | Organic acid | Action |
|---|---|---|
| (a) Sulphonic acids | | |
| Na | 4-methylbenzenesulphonic acid | 1 |
| Mg | 4-chlorobenzenesulphonic acid | 1 |
| Na | 3-nitrobenzenesulphonic acid | 1 |
| Ba | 4-diethylaminobenzenesulphonic acid | 2 |
| Ba | 2-methoxy-5-methylbenzenesulphonic acid | 3 |
| Mg | do | 3 |
| Na | 1,2-dihydroxybenzene-3,5-disulphonic acid | 1 |
| Na | Naphthalene-1-sulphonic acid | 4 |
| Ba | do | 4 |
| Mg | Naphthalene-2-sulphonic acid | 3 |
| Fe [1] | do | 3 |
| Co [1] | do | 3 |
| Cu [2] | do | 2 |
| Na | Anthraquinone-1-sulphonic acid | 3 |
| K | do | 2 |
| K | 2-hydroxynaphthalene-6,8-disulphonic acid | 3 |
| Na | 2-aminonaphthalene-6,8-disulphonic acid | 4 |
| Na | Naphthalene-1,3,5-trisulphonic acid | 4 |
| (b) Phosphonic acids | | |
| Na | Benzenephosphonic acid | 2 |
| Ba | do | 1 |
| Cu | do | 3 |
| (c) Phosphinic acids | | |
| Na | Benzenephosphinic acid | 3 |
| K | do | 3 |
| Na | 2-methylbenzenephosphinic acid | 2 |

[1] Bivalent metal. [2] Monovalent metal.

Example IV

The same polyester as described in Example I, which also contained the same heat-stabilizing system, was mixed homogeneously with 1% w. of sodium naphthalene-1-sulphonate.

The composition thus obtained was milled to sheets after which a number of milled sheets were piled up and shaped to a sheet of 1 mm. thickness in a hydraulic press at 270° C. The sheet was subsequently cooled down to a temperature of 60° C. in the press, during which a phase transition from the molten phase (the melting point of the polyester is 240° C.) to the solid crystalline phase took place. Subsequently, the sheet was removed from the press and further air-cooled to room temperature.

The sheet so obtained had a bright glossy and perfectly smooth surface with a uniform color.

For comparison, this experiment was repeated without sodium naphthalene sulphonate but under otherwise similar conditions.

The sheet made in this comparative experiment had a dull and rough, granular surface, in which large bright white spots consisting of spherulites with a size of from 0.25 to 1 mm. could be observed, which spots showed up against a nonhomogeneously colored background.

I claim:

1. A crystalline linear polyester composition comprising a poly (beta-lactone) and at least one of the nucleating compounds selected from the following groups:
   (a) salts having the general formula MeX, wherein X is a halogen having an atomic number of at least 17 and Me is an alkali metal, and
   (b) metal salts having a valency of 1 to 3 and organic acids containing an acidic hydroxy group which is attached to an aromatic carbon atom by means of a group with the structure

wherein Y is selected from the group consisting of carbon, sulphur and phosphorus atoms.

2. A composition as in claim 1 wherein the beta-lactone is an alpha,alpha-dialkyl-beta-propiolactone wherein each alkyl group contains from 1 to 4 carbon atoms.

3. A composition as in claim 2 wherein the beta-lactone is alpha,-alpha-dimethyl-beta-propiolactone.

4. A composition as in claim 1 wherein the nucleating compound of (a) is selected from the chlorides of sodium and potassium.

5. A composition as in claim 1 wherein the nucleating compound of (b) is selected from the salts of sulphonic, naphthalenesulphonic, phosphinic, and benzenecarboxylic acids.

6. A composition as in claim 5 wherein the nucleating compounds are the salts of 4-tert-alkylbenezene-1-carboxylic acids.

7. A process for preparing crystalline linear polyesters which comprises (1) melting a polymerized beta-lactone in the presence of at least one of the nucleating compounds selected from the following groups:
   (a) salts having the general formula MeX, wherein X is a halogen having an atomic number of at least 17 and Me is an alkali metal, and
   (b) metal salts having a valency of 1 to 3 and organic acids containing an acidic hydroxyl group which is attached to an aromatic carbon atom by means of a group with the structure

wherein Y is selected from the group consisting of carbon, sulphur and phosphorous atoms and then
   (c) cooling said melt.

8. A process as in claim 9 wherein the beta-lactone is alpha,alpha-dimethyl-beta-propiolactone.

References Cited

UNITED STATES PATENTS

| 3,166,531 | 1/1965 | Horn | 260—49 |
| 3,261,800 | 7/1966 | Collins | 260—37 |
| 3,268,486 | 8/1966 | Kloofwijk | 260—78.3 |
| 3,396,128 | 8/1968 | Matumoto et al. | 260—75 XR |
| 3,407,181 | 10/1968 | Kierstead | 260—78.3 |

WILLIAM H. SHORT, Primary Examiner

E. NIELSEN, Assistant Examiner

U.S. Cl. X.R.

260—96